United States Patent [19]
Kuizenga

[11] Patent Number: 4,907,235
[45] Date of Patent: Mar. 6, 1990

[54] INTRA-CAVITY BEAM RELAY FOR OPTICAL HARMONIC GENERATION

[75] Inventor: Dirk J. Kuizenga, Sunnyvale, Calif.

[73] Assignee: Laserscope, San Jose, Calif.

[21] Appl. No.: 377,784

[22] Filed: Jul. 7, 1989

Related U.S. Application Data

[63] Continuation of Ser. No. 176,810, Apr. 1, 1988, abandoned.

[51] Int. Cl.$^4$ ............................................... H01S 3/10
[52] U.S. Cl. ...................................... 372/21; 372/22; 372/101; 307/427
[58] Field of Search ...................... 372/9, 21, 22, 101; 307/427

[56] References Cited

U.S. PATENT DOCUMENTS 4,158,176  6/1979  Hunt et al. ........................... 372/101
4,637,026  1/1987  Liu ....................................... 307/427

Primary Examiner—William L. Sikes
Assistant Examiner—B. R. R. Holloway
Attorney, Agent, or Firm—Skjerven, Morrill, MacPherson, Franklin & Friel

[57] ABSTRACT

Intra-cavity generation of second and higher harmonic frequency laser radiation is improved by inclusion of a lens or multiple-lens arrangement that focuses electromagnetic radiation emitted by the active laser medium on a wavelength conversion means within the cavity or on removal means to remove the second or higher harmonic radiation from the cavity.

18 Claims, 25 Drawing Sheets

INTRA-CAVITY BEAM RELAY FOR OPTICAL HARMONIC GENERATION

This application is a continuation of application Ser. No. 176,810, filed Apr. 1, 1988.

FIELD OF THE INVENTION

This invention relates to efficient production of non-linear optical products of laser radiation, using intracavity optical means.

BACKGROUND OF THE INVENTION

Optical second harmonic generation ("SHG") using a non-linear medium such as a crystal or other similar means, provides a method for doubling, or more generally producing the $N^{th}$ harmonic of, the frequency of electromagnetic radiation emitted by a laser or other high intensity source. Other interactions in a nonlinear medium can produce new wavelengths of light by sum and difference freq. generation, parametric amplification, and related phenomena such as stimulated raman scattering. Second harmonic generation, using a ruby laser to produce light of wavelength substantially 3470 Å, was first reported by Franken, Hill, Peters and Weinreich in Phys. Rev. Letters 7 118 (1961). The theory of intra-cavity SHG has been discussed by R. G. Smith, I.E.E.E. Jour. of Quantum Electr. QE-6, 215–223 (1970) and by many others. Franken and Ward, in Rev. Mod. Phys. 35 23 (1963) has noted that a crystalline medium can produce a second harmonic of the frequency of the incident radiation only if the crystal lacks inversion symmetry so that the second order polarization tensor $d^{ij}$ in the lowest order non-linear polarization term, $P_{(2)} = \Sigma_{i,j}{}^3 = 1\ d^{ij} E_i E_j$ ($E_i = i^{th}$ component of radiation source electric field) does not vanish. If the crystal has inversion symmetry, the lowest order non-linear polarization contribution is cubic in the electric field strengths, and this crystal will produce only third or higher harmonics of the initial frequency. Beam or parametric production of harmonics has been demonstrated in crystals such as $LiNbO_3$, $Ba_2Na(NbO_3)_5$, $LiO_3$, KDP, $KTiOPO_4$ and $K_xRb_{1-x}TiOPO_4$. Laser lines for which SHG has been demonstrated include $\lambda = 0.946$ μm, 1.064 μm and 1.318 μm ($Nd^{3+}$:YAG) and $\lambda = 0.694$ μm (ruby).

BRIEF DESCRIPTION OF THE DRAWINGS

FIG. 26 is a graphic view of the variation of the second harmonic output component from a representative second harmonic crystal, such as $KTiOPO_4$ ("KTP"), with variation in lamp current supplied for pumping the laser medium (here, an Nd:YAG rod).

SUMMARY OF THE INVENTION

The invention is intended to provide intra-cavity means to generate optical wavelengths of light or radiation, using a non-linear crystal or other conversion means positioned within the optical cavity containing the active laser medium, by arranging for radiation emitted by the active laser medium to be relayed with no relative phase change of rays of the radiation beam to an adjacent surface of the conversion means.

Other objects of the invention, and advantages thereof, will become clear by reference to the specification and the accompanying drawings.

In order to achieve these objects, the invention in one embodiment may include an optical cavity, an active laser medium and a non-linear SHG crystal or other conversion means positioned adjacent to one another within the cavity, wavelength-selective coupling to facilitate the removal of SHG radiation from the optical cavity, and optical imaging means positioned within the optical cavity to substantially direct electromagnetic radiation emitted by the active laser medium onto the conversion means.

DETAILED DESCRIPTION

Figure 1:
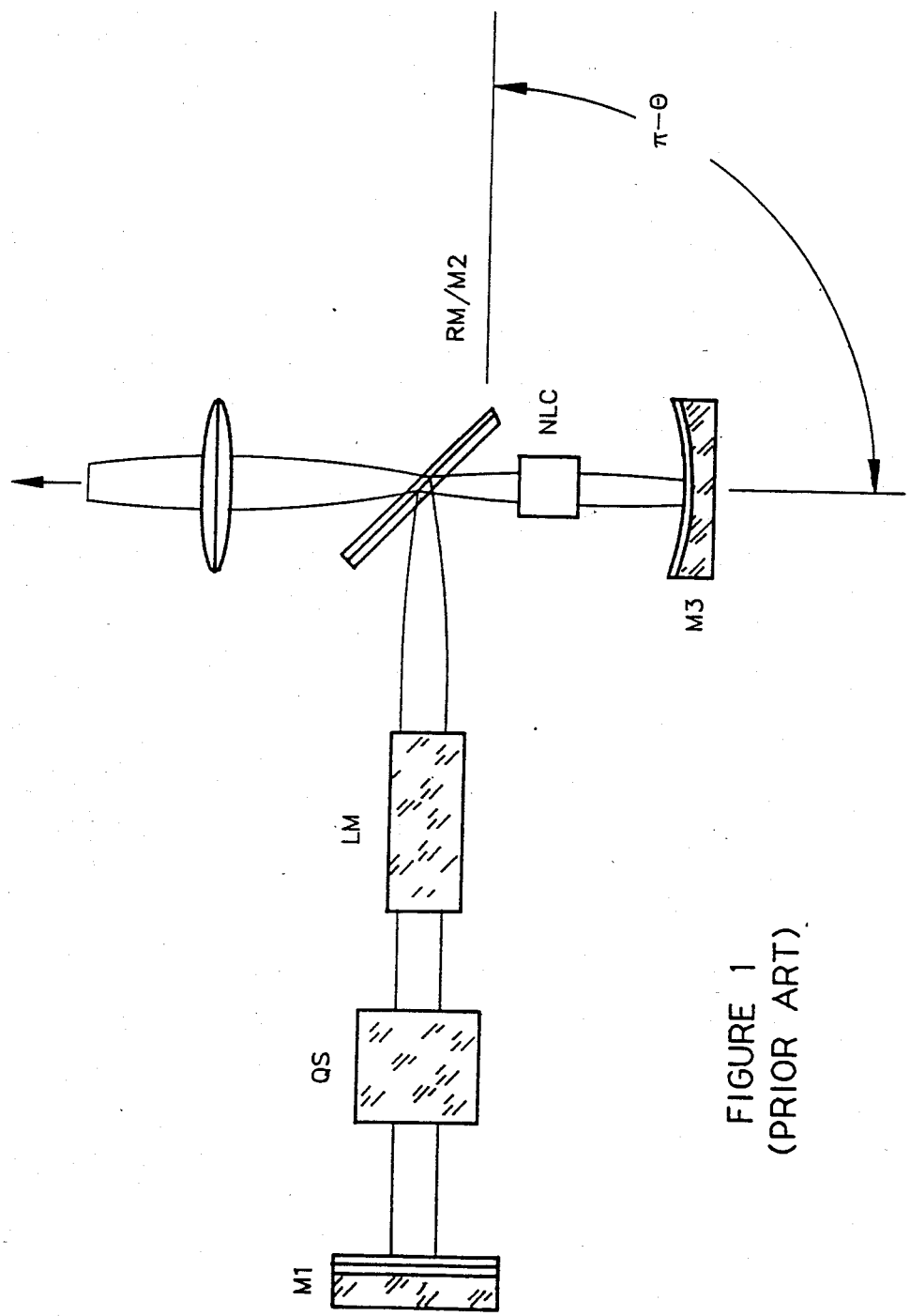
FIGS. 1 and 2 are schematic views of a folded laser system (L shaped) without a lens and with a lens (for optical mode control), respectively, within the optical cavity.

A typical resonator for a high power laser includes an intra-cavity nonlinear crystal NLC, two or three mirrors M1, M2 (and M3), the active laser medium LM, and removal means RM to remove the second harmonic radiation from the cavity, as shown schematically in FIG. 1. In FIG. 1, the resonator is folded into an "L" shape and utilizes a dichroic mirror or other removal means RM/M2, in order to couple out the harmonic beam travelling in both directions through the crystal. This arrangement also prevents the harmonic beam from passing through the laser medium, which is usually absorbing at the harmonic wavelength. The configuration of FIG. 1 may also include a means QS for Q-switching the cavity (optional).

Figure 2:
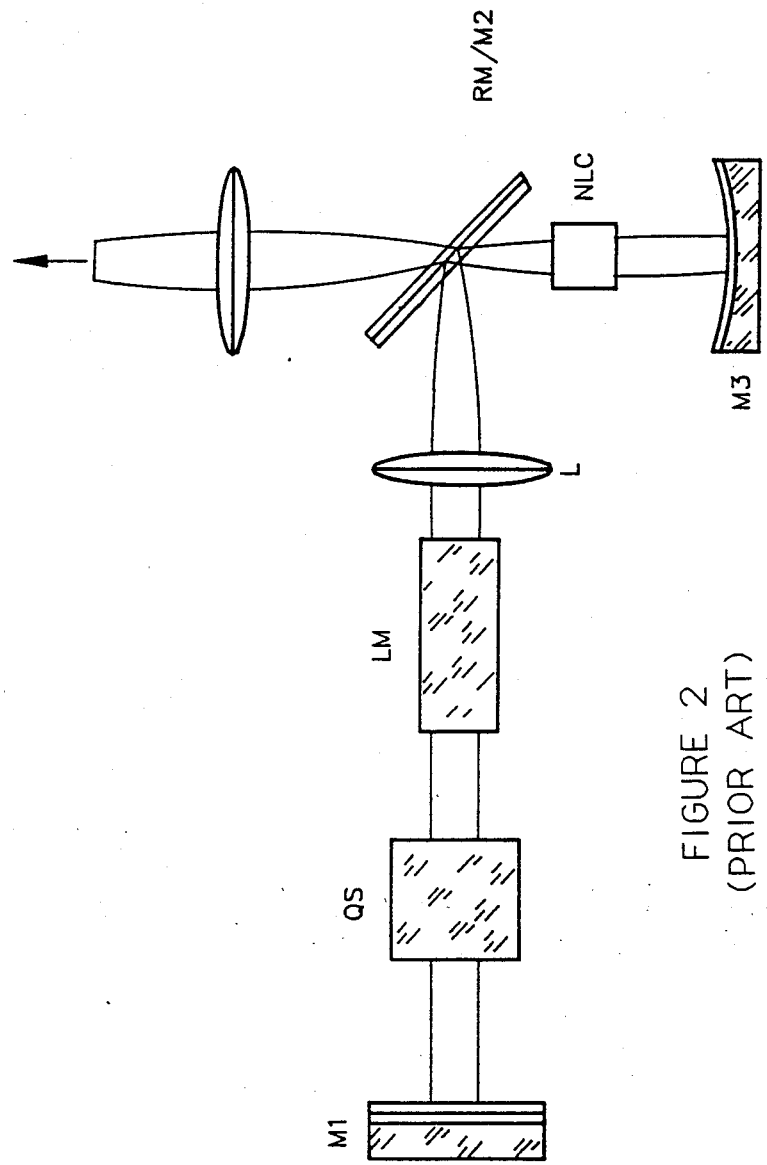

One common high power laser medium is Nd:YAG which, in addition to its role of providing optical gain, behaves as a parasitic lens element. The Effective Focal Length (EFL) of the Nd:YAG depends on the spatial distribution of thermally induced strain in the rod which, in turn, depends on the power absorbed from the arc-lamp. Any factor that alters this power absorption, such as the reflectivity of the lamp housing or the age of, the lamp, can change the EFL of the laser rod. Some designers have included an explicit lens in the resonator in addition to the implicit, thermally-generated lens in the rod, for use in optical mode control but not for focusing. One example is the resonator as shown in FIG. 2.

The spot sizes at the various surfaces in the resonator can be calculated by standard techniques; one finds that the multi-mode spot size on the SHG crystal depends on all the relevant distances and the optical powers of the various mirrors and lenses. The dependence of spot size on the rod EFL is especially important as it determines an allowable range of input power from the arc lamp for which the resonator behaves in a "stable" manner. Stability in this context is a technical term that implies that an optical ray traversing the resonator system will retrace the same path after one complete round trip. One way to demonstrate this stability is to plot the multi-mode spot size versus the EFL; this curve is shown in the lower curve of FIG. 3. The upper curve is an indication of the number of higher-order modes functioning in the resonator. A measure of resonator "quality" is the range in EFL for which the spot size has no significant variation. Note that the spot size can become much smaller for values of EFL near the edges of the stability range. If the resonator operates with these smaller spot sizes, the chances of damaging the intra-cavity nonlinear crystal are significantly increased as the power density will increase as the square of the diameter decreases. In this type of resonator, both the size and position of the beam waist changes as the EFL is varied. Thus designer control over power density is limited, at best.

Figure 3:
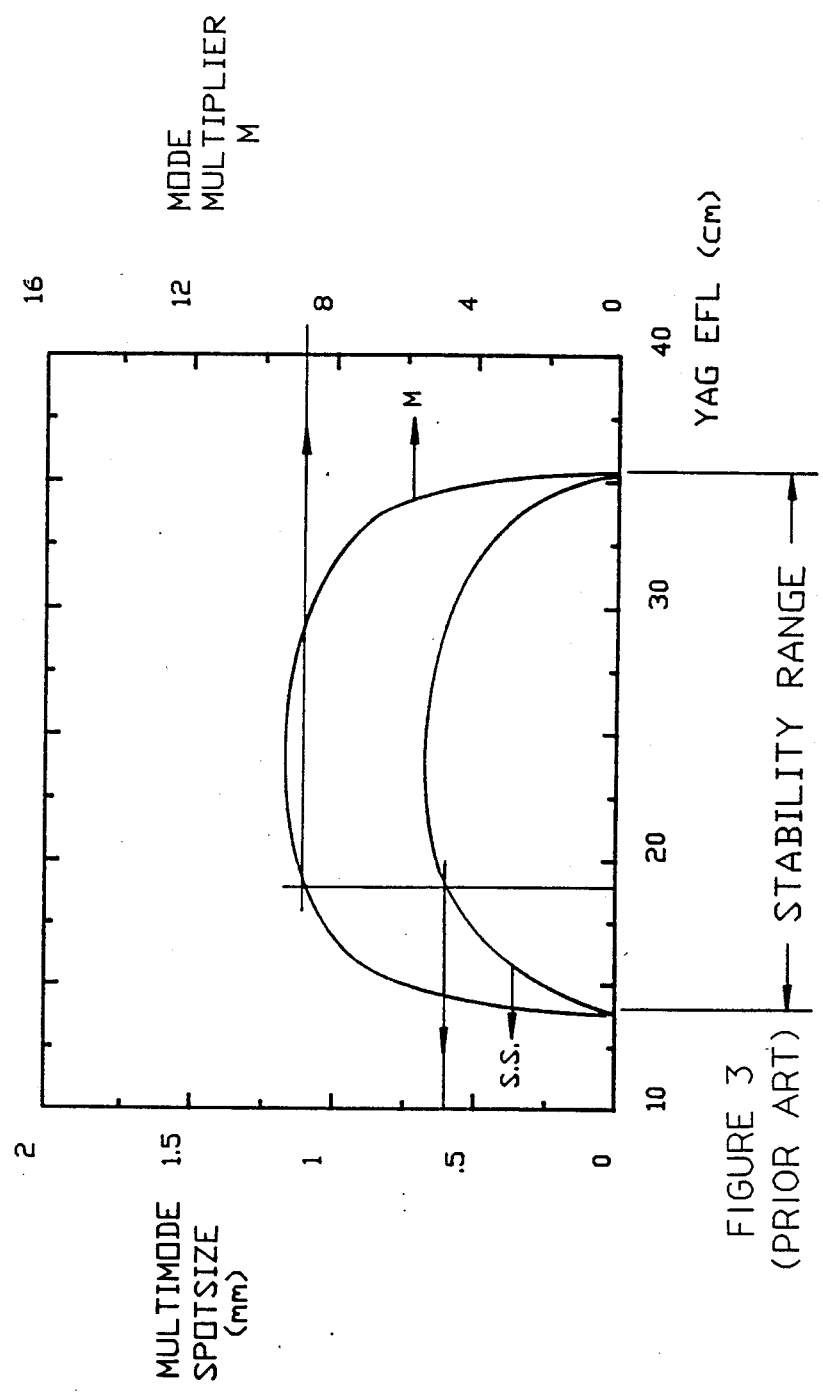
FIG. 3 is a graphic view of multi-mode spot size or beam radius for a resonator such as illustrated in FIG. 1, as a function of the effective focal length (EFL) of the laser medium, for an Nd=YAG rod.

When a laser medium, such as an Nd:YAG rod, is received, the following procedure is preferably followed. The laser power supply is connected to the crystal and the electrical current output is varied to determine the pumping lamp current value for which the second harmonic output component, or more generally the $N^{th}$ harmonic output component, from the crystal is maximized. The Nd:YAG rods often used, have 4 mm diameter by 79 mm length and have 1.1 atomic percent Nd doping. For such rods, a current of 26–36 Amps, corresponding to a power input to the lamp of 2.6–3.6 kilowatts, usually yields the maximum SHG output component. The SHG output decreases on either side of this current value, as shown in FIG. 26. For this optimal choice of current the EFL of the Nd:YAG rod is usually 18–21 cm; increasing the lamp current will usually decrease the EFL, and inversely. However, as indicated in FIG. 3, as the EFL decreases below approximately 18 cm the multi-mode spot size or beam radius decreases sharply. In practice, for an Nd:YAG rod of the dimensions set forth above, an EFL in the approximate range of 18–36 cm is desirable. These numbers (optional lamp current, preferred range of EFL) will change with the dimensions and the material used to fabricate the crystal; but the qualitative effects will be similar with other laser crystals such as rare earth-doped crystals or any of the crystals mentioned in the Background section above.

Central to this invention is the observation that one can use an imaging or relay system inside the resonator to relate the size of the spot at the SHG crystal to fixed geometrical factors that do not change with the rod EFL. For example, if the rod and SHG crystal are placed in conjugate planes of an imaging system with magnification, m, then it is possible to design a resonator whose multi-mode spot size in the crystal is virtually constant at a value which is m times smaller than the effective aperture of the Nd:YAG rod.

Figure 4:
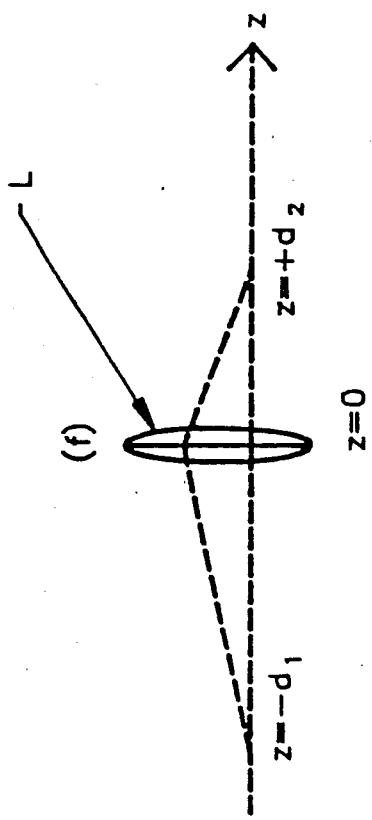
FIG. 4 is a schematic view of the idealized focusing properties of a single thin lens L.

The simplest imaging system is a single lens L in which the conjugate planes are defined by the well-known lens equation $$1/d_1 + 1/d_2 = 1/f,$$

where f is the focal length and $d_1$ and $d_2$ are corresponding distances of an axial source and its axial image from the lens L, as shown in FIG. 4. The ABCD or ray matrix for this system between conjugate planes is $$M = \begin{bmatrix} -m & 0 \\ -1/f & -1/m \end{bmatrix}$$

The presence of a non-zero off-diagonal element suggests that a transformation by this simple imaging system does not preserve the phase; in fact, only the magnitude of the light distribution is relayed (unaltered) between the conjugate planes, with magnification m. In actual designs with a single lens imager, one finds that the multi-mode spot size is indeed constant, but that the region of resonator stability exists only for rather short range of Nd:YAG EFLs and that very high-order modes exist that make it difficult to couple the laser radiation into an optic fiber delivery system.

Figure 5:
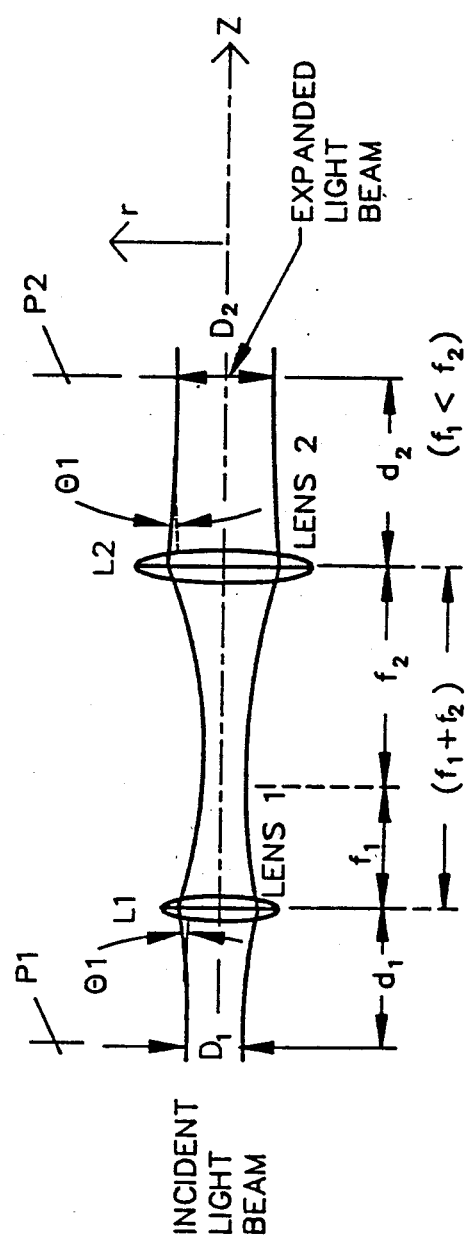
FIG. 5 is a schematic view of the focusing properties of a two lens system applied to a light beam.
Figure 6:
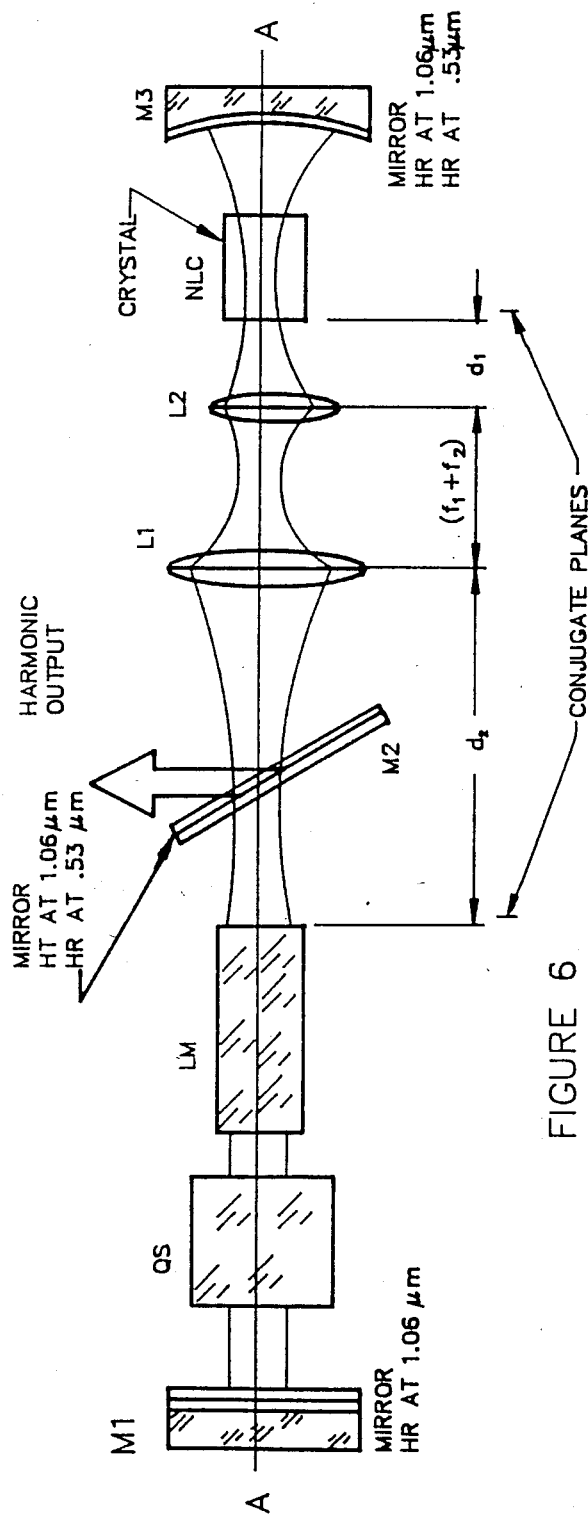
FIG. 6 is a schematic view of a laser resonator system containing a two lens optical relay and showing the conjugate planes of the two lens system.

An alternative imaging, or relay system is a Keplerian-type beam expander containing two axially-oriented lenses, such as shown in FIG. 5, and a resonator using this relay system is shown in FIG. 6. This has the interesting property that it will relay the magnitude phase and preserve the of any light distribution at the input conjugate plane to the output conjugate plane with a magnification m. For analysis of the full ray matrix see the analysis presented in A. Yariv, *Optical Electronics*, Holt, Rinehart and Winston, 1985, Third Edition, pp. 17–22, which is incorporated herein by reference. The ray matrix description of the arrangement in FIG. 5 is $$\begin{bmatrix} r_2 \\ u_2 \end{bmatrix} = \begin{bmatrix} 1 & d_2 \\ 0 & 1 \end{bmatrix} \begin{bmatrix} 1 & 0 \\ -1/f_2 & 1 \end{bmatrix} \begin{bmatrix} 1 & f_1 + f_2 \\ 0 & 1 \end{bmatrix} \begin{bmatrix} 1 & 0 \\ -1/f_1 & 2 \end{bmatrix} \begin{bmatrix} 1 & d_1 \\ 0 & 1 \end{bmatrix} \begin{bmatrix} r_1 \\ u_1 \end{bmatrix} = \begin{bmatrix} A & B \\ C & D \end{bmatrix} \begin{bmatrix} r_1 \\ u_1 \end{bmatrix} \quad (1)$$

relating the ray descriptors $r_1$ and $u_1 = (dr/dz)_1$, of a ray at one plane P, in FIG. 5 to the ray descriptors $r_2$ and $u_2 = (dr/dz)_2$ of the ray at the conjugate plane $P_2$.

The off-diagonal terms B and C vanish and phase can be preserved, only if $$f_1^2/(f_1 - d_1) + f_2^2/(f_2 - d_2) = 0, \quad (2)$$

or $$md_1 + d_2/m = f_1 + f_2 \quad (2')$$

$$m = f_2/f_1, \quad (3')$$

and the diagonal terms become $$A = -f_2/f_1 = -m, \quad (4)$$

$$D = -f_1/f_2 = 1/A = -1/m. \quad (5)$$

The quantity $m = f_2/f_1$ may be identified with the magnification of the system, and the minus sign in the two diagonal terms in Eq (1) indicate that the image is inverted.

Some typical values for a real system are: $f_1 = 10$ cm, $f_2 = 25$ cm, and $m = f_2/f_1 = 2.5$. For an effective diameter of 3.6 mm for a Nd:YAG rod, the spot diameter in the SHG crystal will be 3.6 mm/2.5 = 1.44 mm.

Figure 7:
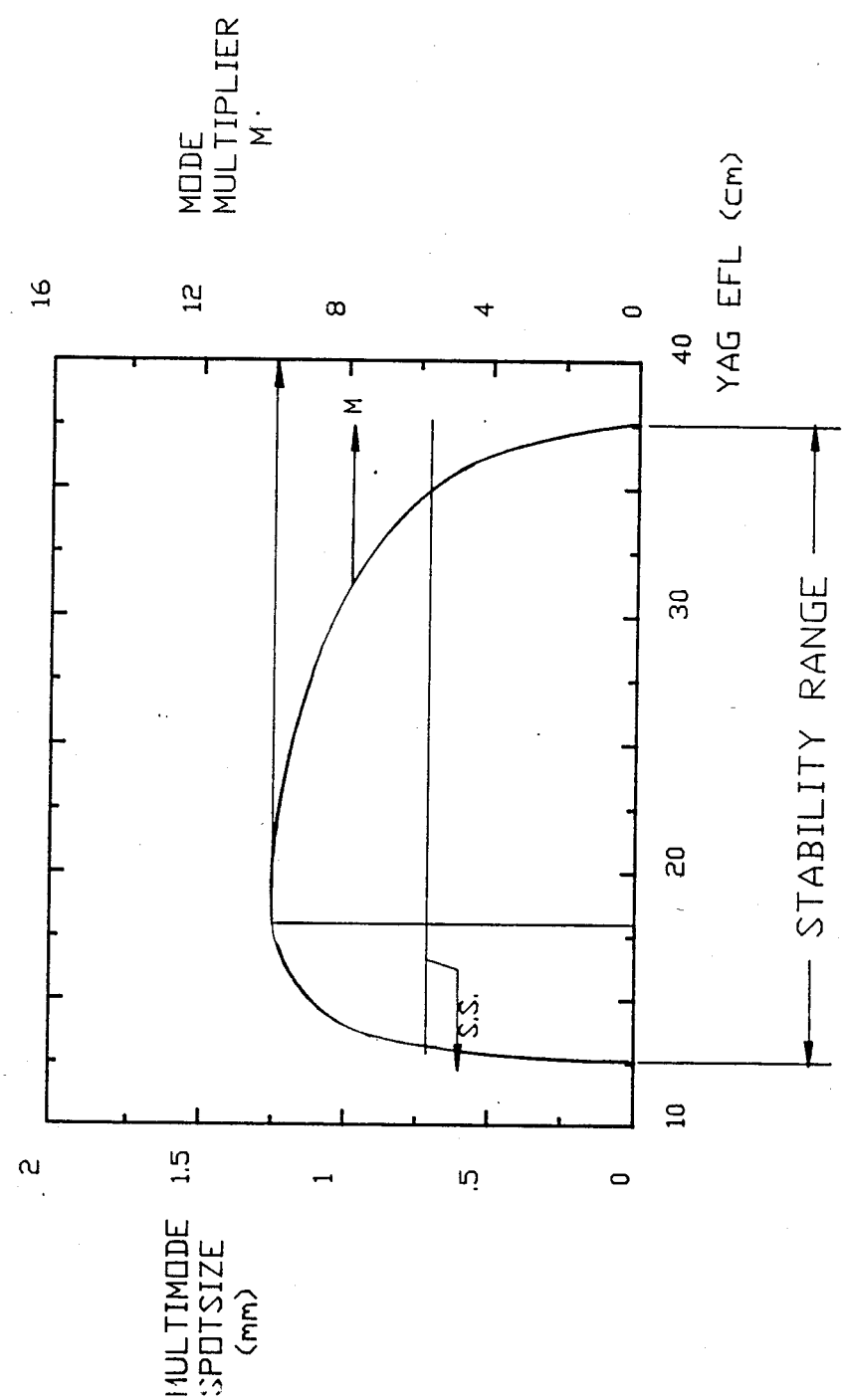
FIG. 7 is a graphic view of multi-mode spot size as a function of EFL, for a two lens system such as shown in FIG. 5.

Actual designs with this two-lens relay system yield much better ranges in rod EFL for stable operation compared to the single lens system. A typical stability diagram is shown in FIG. 7. A complete resonator analysis confirms the constant multi-mode spot size arguments above, and a resonator with this constant-spot-size-property-reduces the likelihood that operation near instability could result in very small spot sizes and high power densities. Thus damage to the crystal is minimized. One should note that, in general, when the nonlinear crystal is located in one of the relay system's conjugate planes, it is not coincident with a beam-waist in the resonator.

Figure 8:
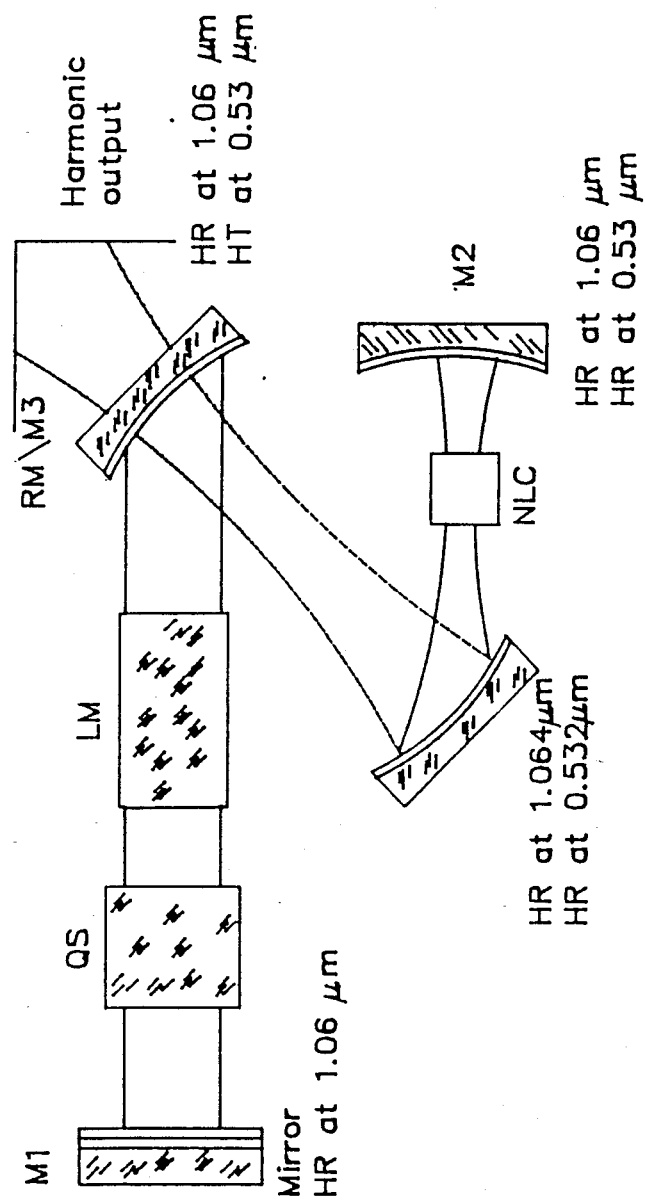
FIG. 8 is a schematic view of a folded laser resonator using two curved intermediate mirrors (M3,M4) of negative curvature as the first and second lenses for the optical relay.

One need not use transmissive optics to accomplish the two-lens design; reflective optics can be used, and one arrangement of such a resonator is shown in FIG. 8.

Figure 9:
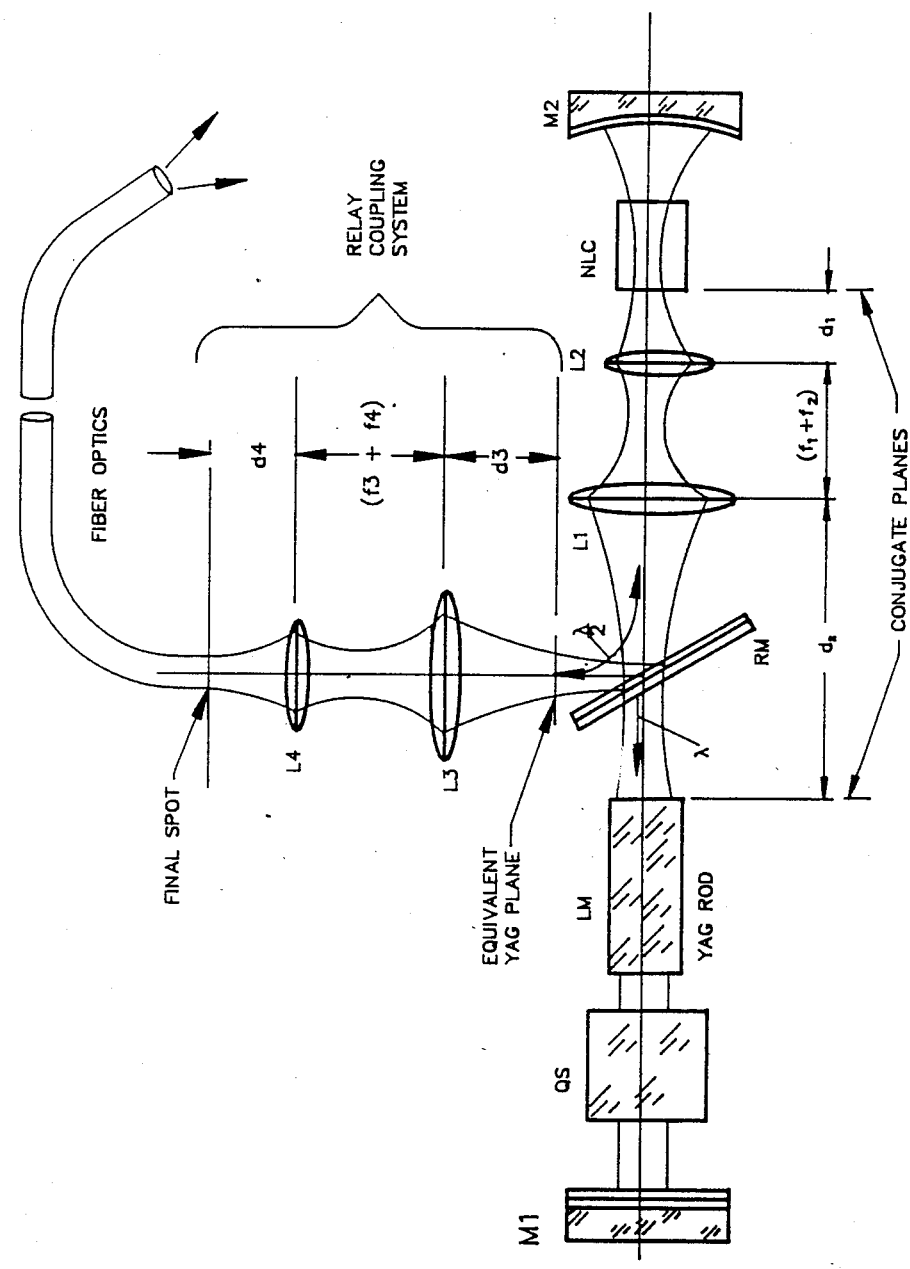
FIG. 9 is a schematic view of a linear laser resonator according to the invention, with the two lens optical relay, showing the use of a two lens relay "beyond" the position of a removal means RM (dichroic mirror or similar means) that is used to remove the second harmonic component from the optical cavity.

The two-lens relay system can also be used effectively to transfer a constant-spot-size beam from the laser to a final spot location as determined by the application. One such application is the launching of laser-generated harmonics into an optical fiber. The schematic for such a system is shown in FIG. 9. Here the relay design concept begins from the realization that there is a plane in the output beam which is equivalent to the end of the Nd:YAG rod This equivalent plane is also a distance $d_2$ from lens L2 but is folded by the wavelength-selective beam splitter. The multi-mode spot size in the equivalent plane is the same as the spot size of the YAG itself.

Given this substantially constant spot size in space, one can employ the same relaying properties of the two-lens system to transfer a magnified (or demagnified) version of the spot to a relevant position in space, say the input end of an optical fiber. FIG. 9 shows such an output coupling relay system comprised of lenses L3 and L4 positioned so that the conjugate planes are coincident with the laser medium equivalent plane and the fiber input. FIG. 9 also shows the removal means RM that is used to remove the second harmonic component from the optical cavity; RM may be a dichroic mirror that transmits light of wavelength $\lambda$ and reflects light of wavelength $\lambda/2$.

Once again, it should be noted that the conjugate planes of both relay systems shown in FIG. 9 need not, in general, coincide with the Gaussian beam waists in the system. If flat wavefronts at a particular position are important to a specific application, the same design principles apply, except that additional lenses may be required to correct wavefront curvatures. Additional lenses may be required when reflective optics are used; transmitted beams are modified by the optical power of spherical substrates, but in either case the design principles are staightforward adaptations of the underlying relaying principle.

Figure 10:
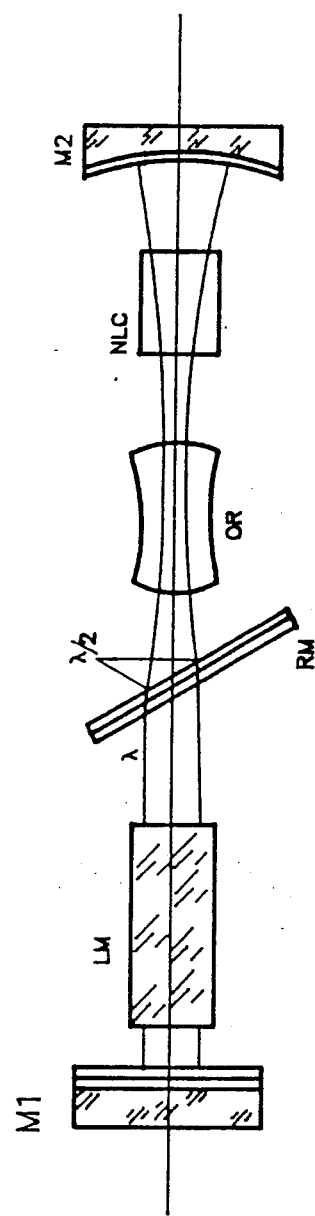
FIGS. 10, 11, 12 and 13 are schematic views of linear optical resonators for different arrangements of the optical relay OR, the removal means RM and the nonlinear crystal NLC according to the invention.
Figure 11:
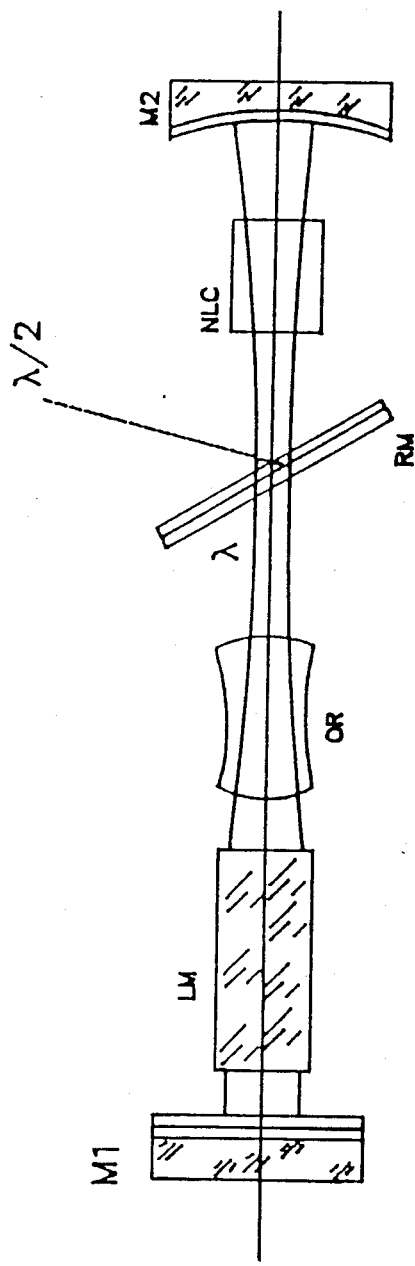
Figure 12:
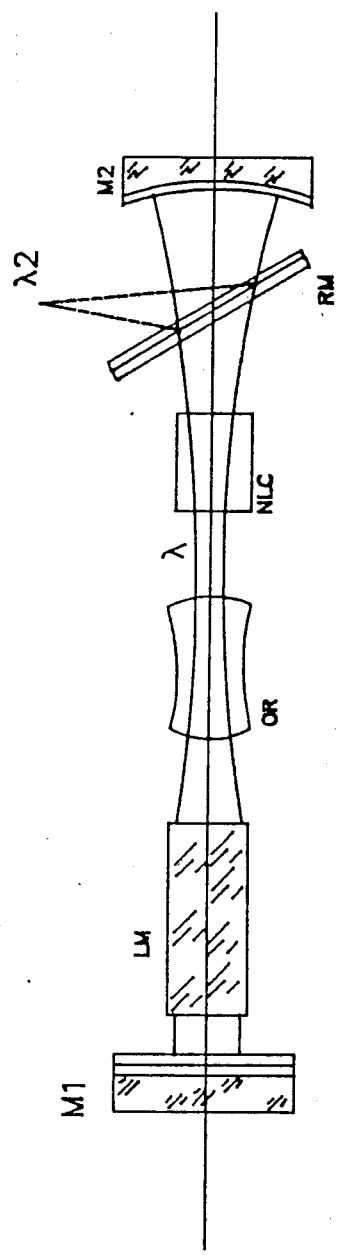
Figure 13:
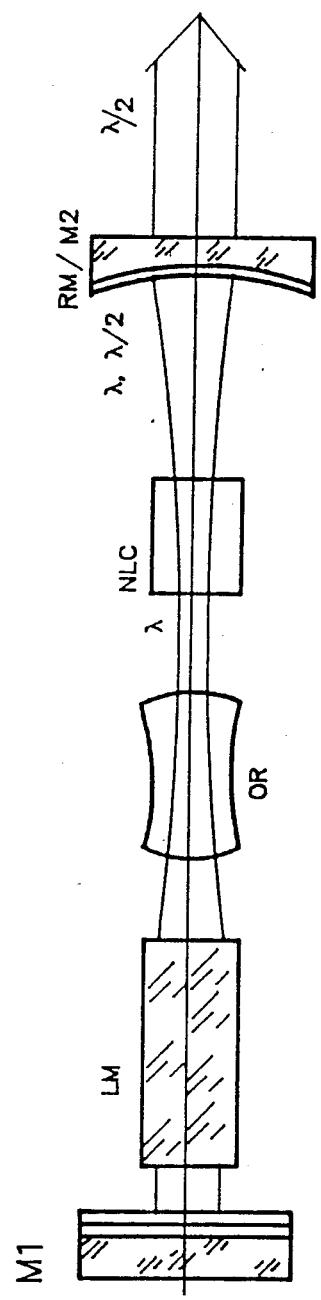

The relative positions of the optical relay OR or/and the removal means RM within the cavity may be permuted, and in some instances the second or third mirror may serve as the removal means. Where two rather than three mirrors define the optical cavity (usually linear), at least four distinct combinations of positions are available. In FIG. 10, the order of positions is first mirror M1, laser medium LM, removal means RM, optical relay OR, the nonlinear crystal or other wavelength conversion means NLC and the second mirror M2. The removal means RM is shown here for simplicity as a partly transmitting, partly reflecting mirror but other types of removal means RM may also be used. The optical relay means OR is shown here for simplicity as a single lens, but it is understood that more general optical relay means OR may also be used. In a second linear embodiment, shown in FIG. 11, the order is M1, LM, OR, RM, NLC and M2. In a third linear embodiment, shown in FIG. 12, the order is M1, LM, OR, NLC, RM and M2. FIG. 13 has substantially the same arrangement as in FIG. 12, but the removal means and second mirror are merged together and denoted M2/RM. In the four embodiments of FIGS. 10–13, the second mirror is preferably spherical or curvilinear rather than planar.

Figure 14:
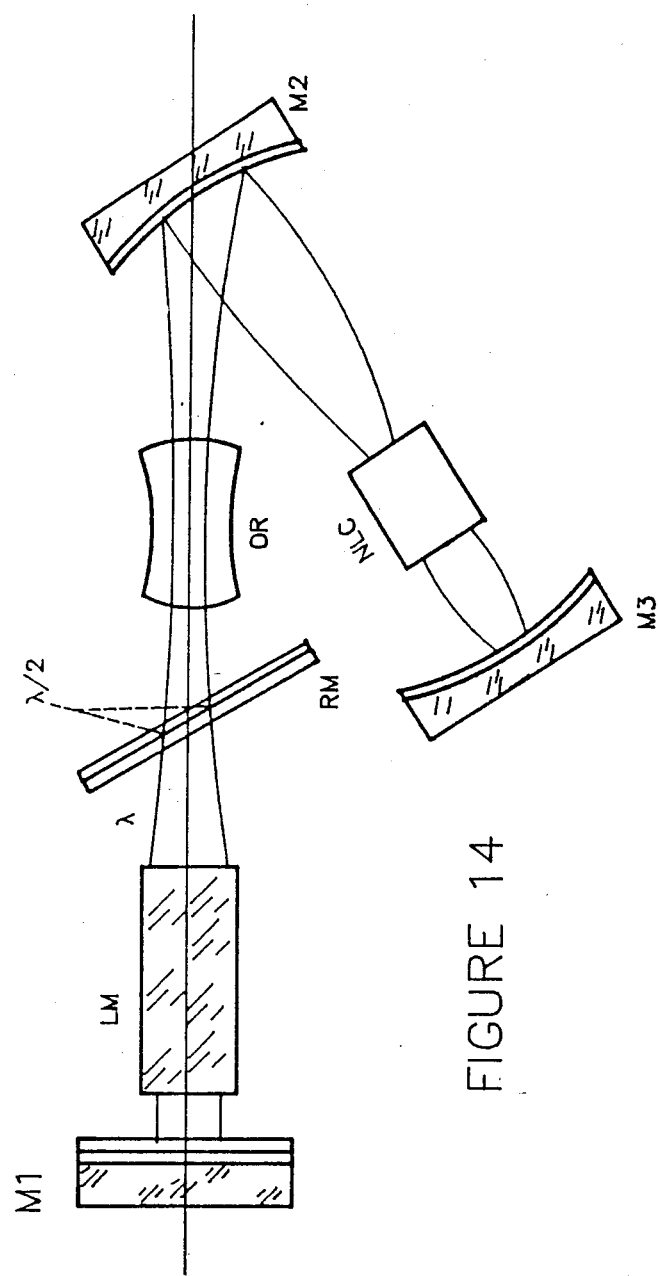
FIGS. 14–25 are schematic views of folded optical resonators for different arrangements of the optical relay OR, the removal means RM and the nonlinear crystal NLC according to the invention.
Figure 15:
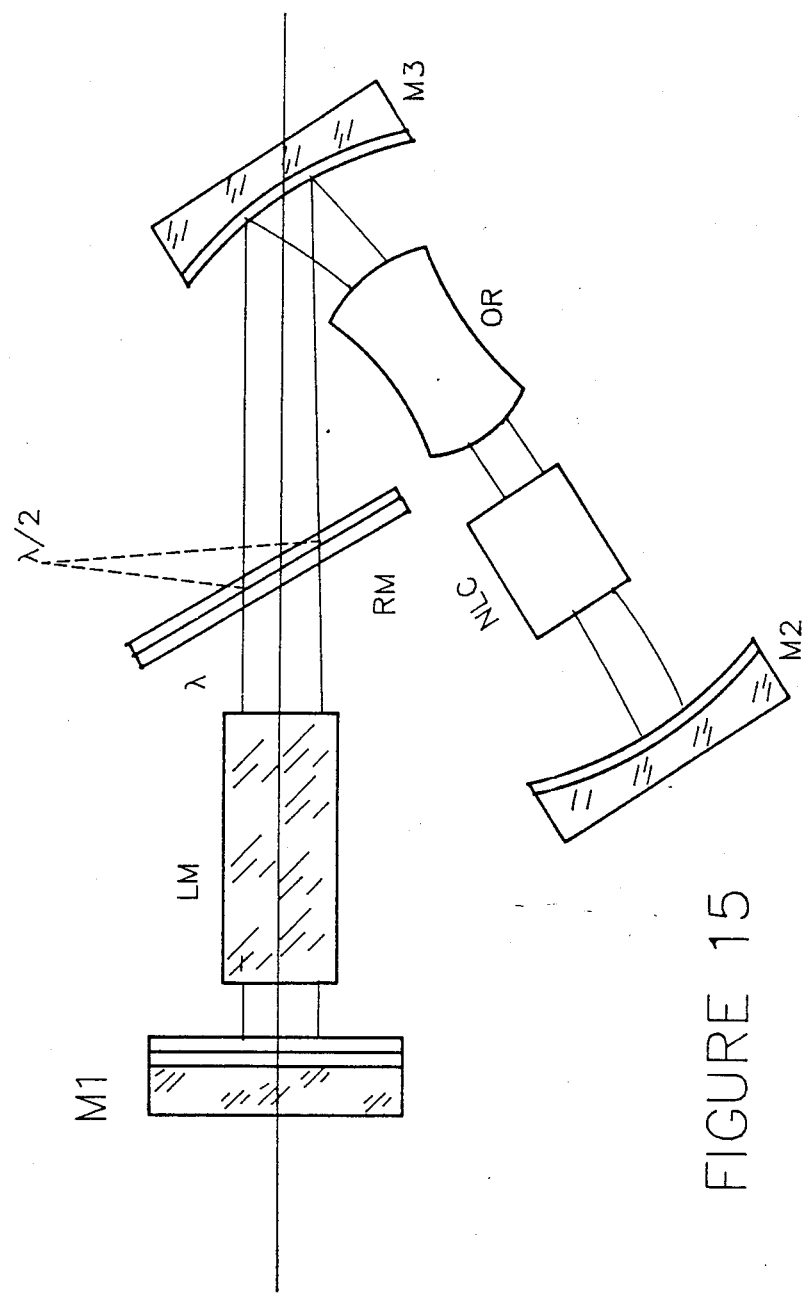
Figure 16:
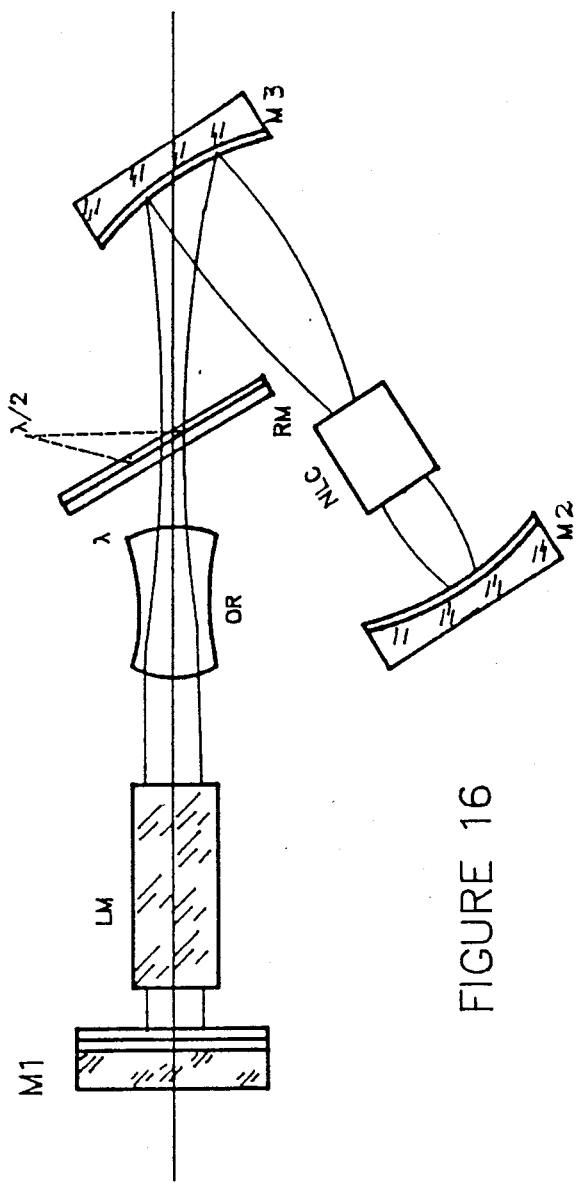
Figure 17:
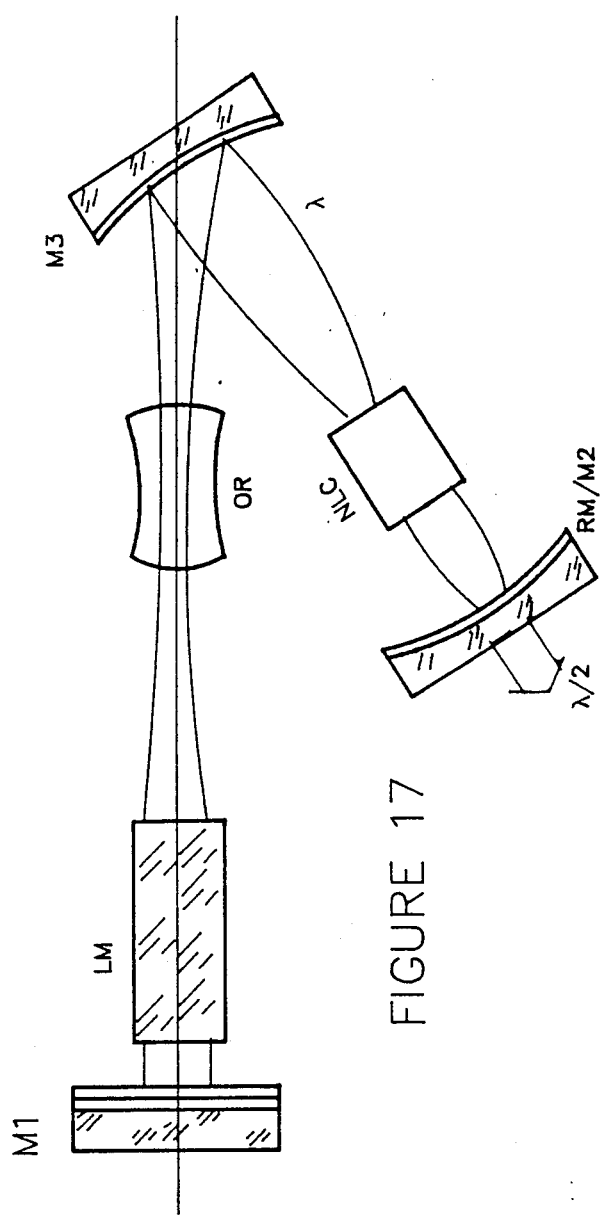
Figure 18:
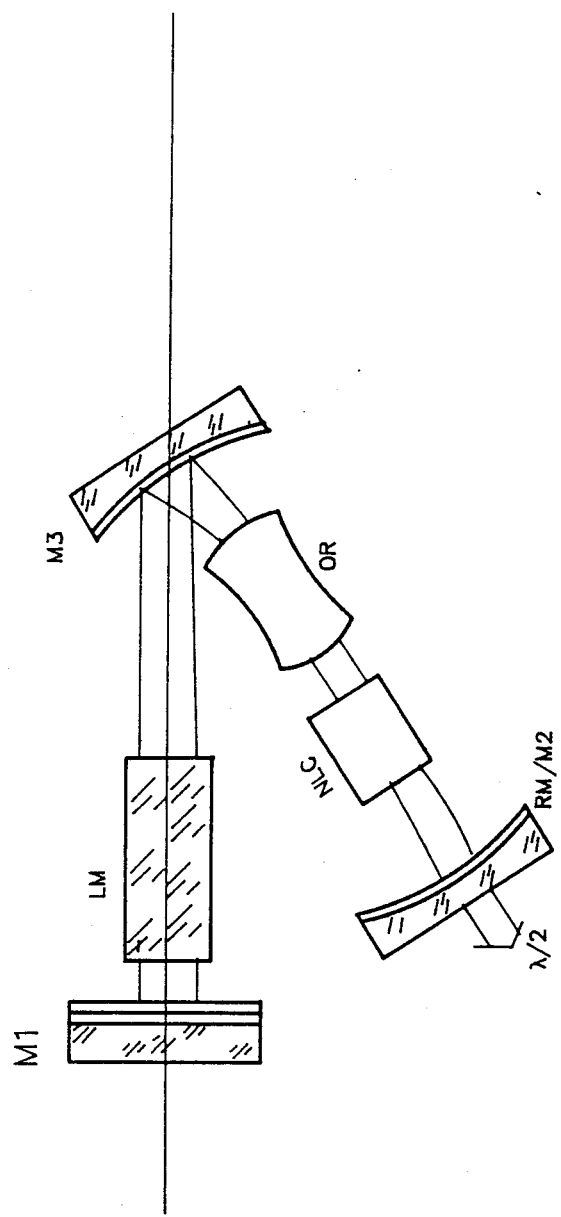
Figure 19:
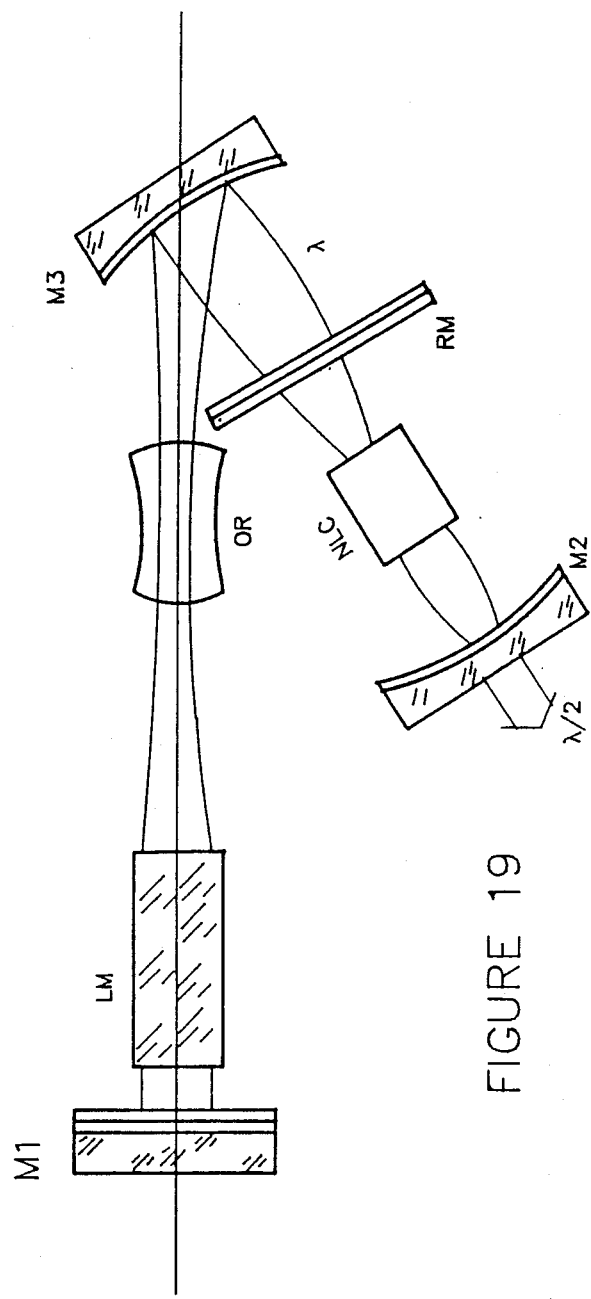
Figure 20:
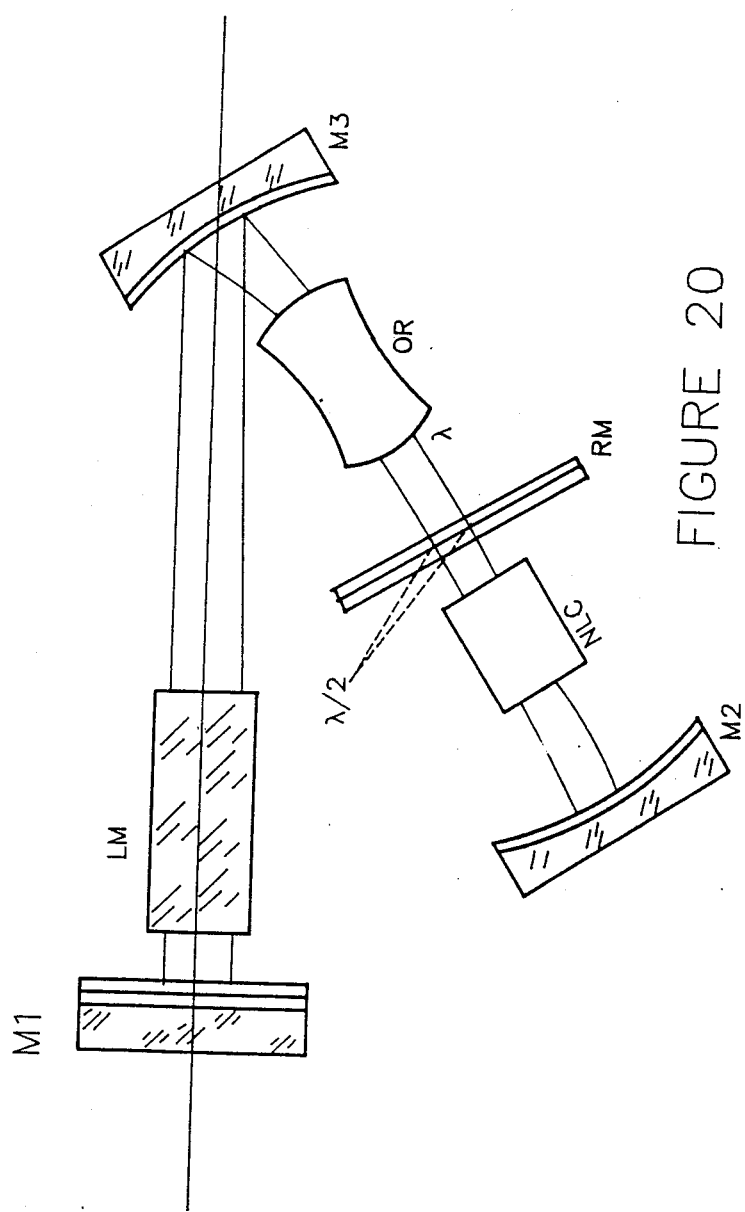
Figure 21:
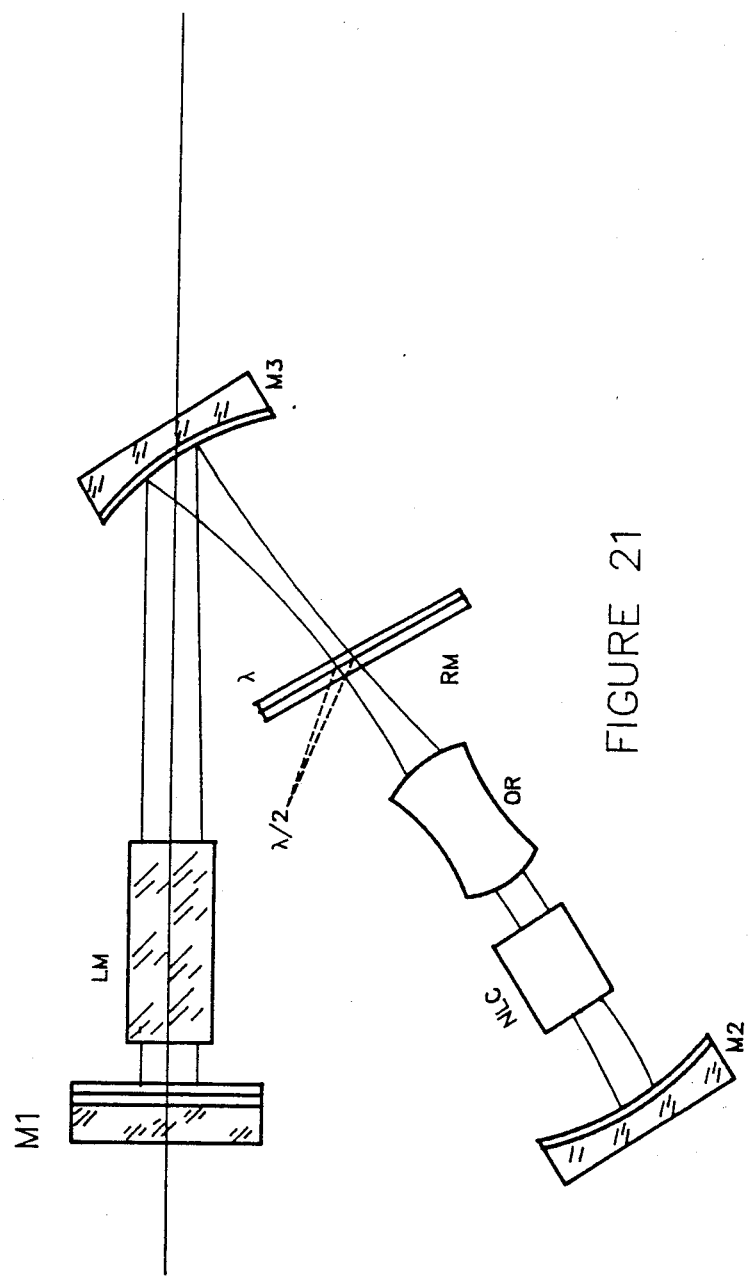
Figure 22:
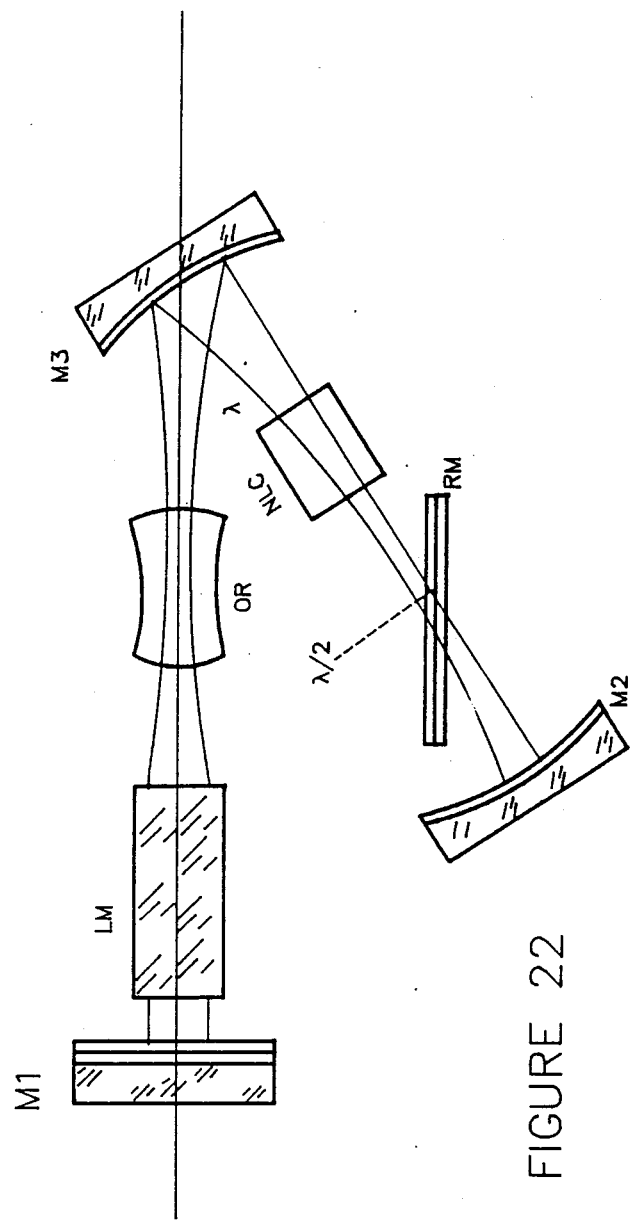
Figure 23:
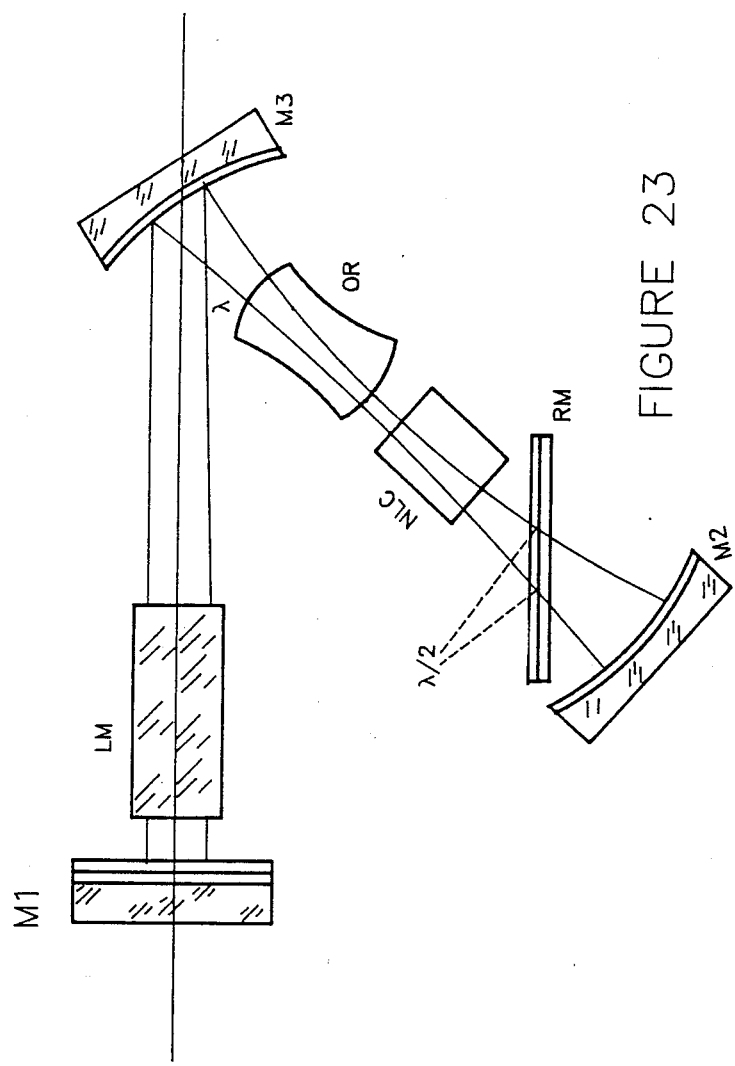
Figure 24:
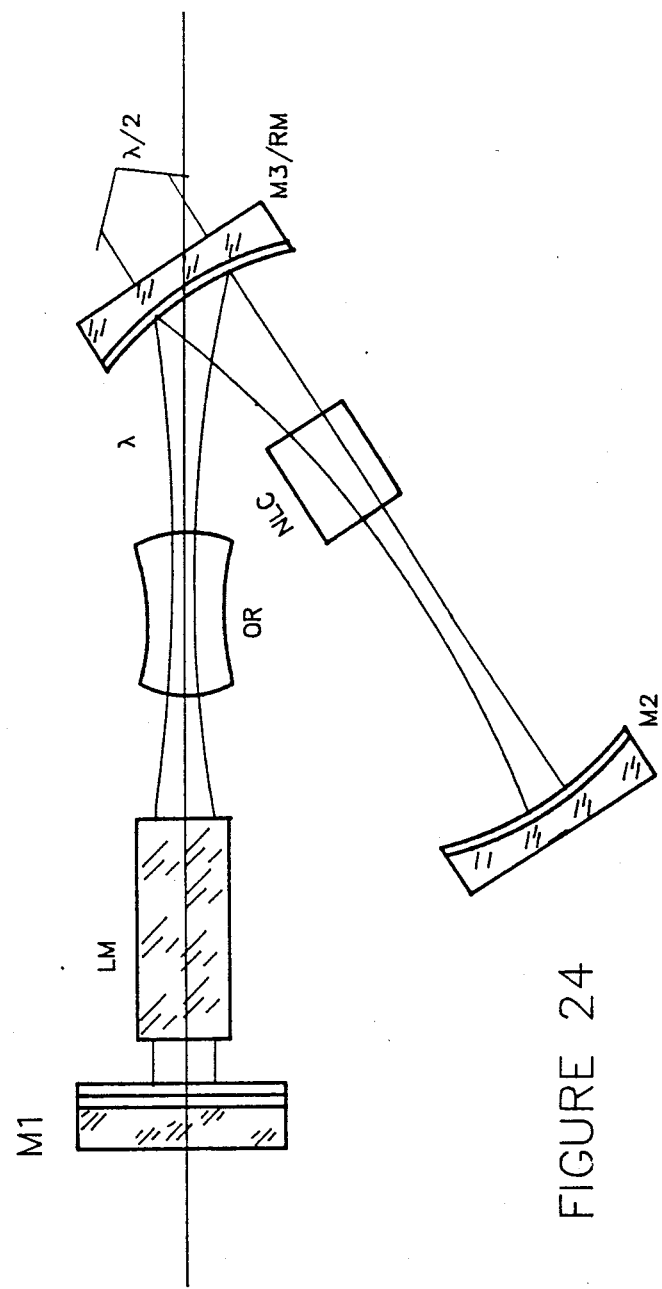
Figure 25:
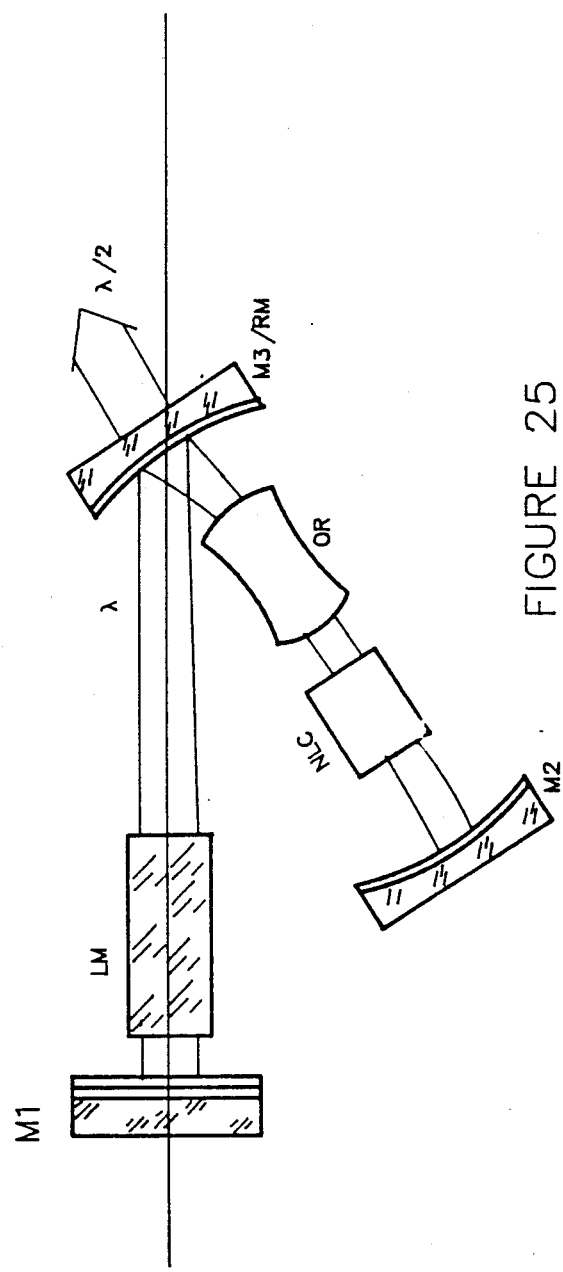

If one uses three mirrors M1, M2 and M3 to define the optical cavity, at least 12 embodiments exist, as illustrated in FIGS. 14–25. In FIG. 14, the order is M1, RM, OR, M2, NLC and M3. In FIG. 15, the order is M1, LM, RM, M2, OR, NLC and M3. FIG. 16 is substantially the embodiment of FIG. 14, with the relative positions of removal means RM and optical relay OR interchanged. FIGS. 17 and 18 are substantially the embodiments of FIGS. 14 and 15, with the removal means and second mirror M2 merged together and denoted M3/RM. In FIG. 19, the order is M1, LM, OR, M2, RM, NLC and M3. In FIG. 20, the order is M1, LM, M2, OR, RM, NLC and M3. In FIG. 22, the order is M1, LM, OR, M2, NLC, RM and M3. In FIG. 23, the order is M1, LM, M2, OR, NLC, RM and M3. In FIGS. 24 and 25, the removal means RM and the third mirror merge and are denoted M2/RM. In FIG. 24, the order is M1, LM, OR, M2/RM, NLC and M3. In FIG. 25, the order is M1, LM, M2/RM, OR, NLC and M3.

With reference to FIG. 6, a wave propagating along an axis AA away from a first mirror toward an optical relaying system within the cavity may not have a planar wave front; and if such wave passes through another optical element before it reaches tee optical relaying system, the refractive power of this optical element will not be the same for all rays associated with the wave but will vary with the distance from the axis of the surface point of the optical element intersected by the ray. Before this wave reaches the optical relaying system, the wave should be corrected (1) for varying refraction by intervening optical elements and (2) to flatten or make planar the wave front.

Although the preferred embodiments of the invention have been shown and described herein, variation and modification may be made without departing from the scope of the invention. In particular, although the description has considered second harmonic generation, the same principles apply to a crystal that produces third, or more generally $N^{th}$ harmonics. For example, a crystal such as $CdHg(SCN)_4$, which has a center of inversion, would produce third harmonic light as the lowest order nonlinear component.

I claim:

1. Laser resonator structure that comprises:

an optical cavity, containing a first mirror and a second mirror, that is resonant for electromagnetic radiation of a first predetermined wavelength;

a laser medium, positioned within the optical cavity, to produce a beam of electromagnetic radiation of approximately the first wavelength that follows an optical path as the radiation beam propagates within the optical cavity;

means, positioned within the optical cavity and spaced apart from the laser medium, for receiving radiation of the first wavelength produced by the laser medium; and relaying means, positioned within the optical cavity between the laser medium and the means for receiving, for accepting a radiation beam of a first diameter $D_1$ at a defined position relating to the laser medium and for relaying this radiation to the means for receiving so that the radiation beam has a second diameter $D_2$ at the means for receiving and the ratio m of the diameters $D_2/D_1$ is independent of the properties of the mirrors in the optical cavity and the focusing properties of the laser medium and the means for receiving.

2. Structure as in claim 1, wherein the ratio of the diameters $D_2/D_1$ is determined only by the properties of the relaying means.

3. Structure as in claim 1, wherein the relaying means comprises a first lens having a focal length $f_1$ in series with a second lens having a focal length $f_2$ and the ratio m equals $f_2/f_1$.

4. Structure as in claim 1 including a Q switch operatively mounted in said optical cavity.

5. Structure as in claim 1, including removal means, positioned within or forming part of the optical cavity, for receiving radiation from the means for receiving and for allowing at least a portion of this radiation of the second wavelength to exit from the optical cavity while retaining radiation of the first wavelength within the optical cavity.

6. Structure as in claim 1, wherein said relaying means comprises a first lens of focal length $f_1$ and a second lens of focal length $f_2$, where the first lens lies between the second lens and the laser medium, the second lens lies between the first lens and the means for receiving, the first lens and the second lens are spaced apart by a distance of $f_1 + f_2$, the first lens is spaced apart from the laser medium by a distance $d_2$, the second lens is spaced apart from the means for receiving by a distance $d_1$, and $f_1$, $f_2$, $d_1$ and $d_2$ are related by the relation $f_1^2/(f_1 - d_1) + f_2^2/(f_2 - d_2) = 0$.

7. Structure as in claim 1, wherein said means, positioned within the optical cavity and spaced apart from the laser medium, for receiving radiation, comprises means for converting a portion of the received radiation to radiation of a second predetermined wavelength.

8. Structure as in claim 6, wherein the first lens in said relaying means is replaced by a third mirror having a first radius of curvature and said second lens in said relaying means is replaced by a fourth mirror having a second radius of curvature.

9. Structure as in claim 8, wherein a selected one of said third and fourth mirrors is selected to be transmissive at a second wavelength and highly reflective at the first wavelength thereby to allow the radiation at said second wavelength generated by said nonlinear crystal to be removed from said cavity through said selected one of said third and fourth mirrors.

10. Structure as in claim 7, wherein said means for converting comprises a nonlinear crystal.

11. Structure as in claim 7, wherein said optical cavity contains a third mirror in addition to said first mirror and said second mirror.

12. Structure as in claim 7, wherein said first predetermined wavelength is chosen to be $\lambda_1$, and said second predetermined wavelength is chosen to be $\lambda_1/N$ where N is an integer $\geq 2$.

13. Structure as in claim 10, wherein said laser medium has an effective focal length, said beam has a diameter $D_1$ at the output end of the laser medium and said relaying means is chosen so that the ratio m of said radiation beam diameter $D_2$ at said nonlinear crystal to the beam diameter $D_1$ at the output end of the laser medium is approximately constant as the effective focal length of said laser medium varies over a predetermined range.

14. Structure as in claim 11 wherein said first mirror is highly reflecting at said first wavelength;

wherein said second mirror is positioned to receive and reflect radiation from the first mirror, the second mirror being highly reflective for radiation at said first wavelength and at said second wavelength; and wherein said third mirror is positioned to receive radiation from the second mirror, with the third mirror being transmissive at said first wavelength and being highly reflective at said second wavelength for radiation that is incident on this third mirror, so as to remove radiation of said second wavelength from said optical cavity.

15. Laser resonator apparatus that comprises;

an optical cavity that is resonant for electromagnetic radiation of a first predetermined wavelength;

a laser medium, positioned within the optical cavity and having at least one output end, to produce a beam of electromagnetic radiation of approximately the first wavelength;

means, positioned within the optical cavity and spaced apart from the laser medium, for receiving radiation of the first wavelength produced by the laser medium;

relaying means, positioned within the optical cavity between the laser medium and the means for receiving, for accepting a radiation beam of a first diameter $D_1$ at the output end of the laser medium and for relaying this radiation to the means for receiving so that the radiation beam has a second diameter $D_2$ at the means for receiving, wherein the relaying means is a lens of focal length f, spaced apart from the laser medium by a distance $d_1$ and spaced apart from the means for receiving by a distance $d_2$, where f, $d_1$ and $d_2$ are related by the relation $1/f = 1/d_1 + 1/d_2$; so that the ratio of diameters $D_2/D_1$ is given by $d_2/d_1$; and removal means, positioned within or forming part of the optical cavity, for receiving radiation from the means for receiving and for allowing at least a portion of this radiation of the second wavelength to exit from the optical cavity while retaining radiation of the first wavelength within the optical cavity.

16. Apparatus according to claim 15 wherein said means for receiving comprises a nonlinear crystal positioned to receive radiation of the first wavelength produced by the laser medium and to convert a portion of the received radiation of the first wavelength to radiation of a second predetermined wavelength.

17. Apparatus according to claim 16, wherein said laser medium has an effective focal length, said radiation beam has a diameter $D_1$ at an output end of said laser medium and said relaying means is chosen so that the ratio m of said radiation beam diameter $D_2$ at said nonlinear crystal to the beam diameter $D_1$ is approximately constant as the effective focal length of said laser medium varies over a predetermined range.

18. Apparatus according to claim 16, wherein said first predetermined wavelength is chosen to be $\lambda_1$ and said second predetermined wavelength is chosen to be $\lambda_1/N$, where N is an integer $\geq 2$.

* * * * *